United States Patent
Magne

(10) Patent No.: US 9,226,269 B2
(45) Date of Patent: Dec. 29, 2015

(54) MULTI-WAVEFORM AND WIRELESS VERY HIGH THROUGHPUT RADIO SYSTEM

(75) Inventor: François Magne, Paris (FR)

(73) Assignee: Bluwan, Chatou (FR)

(*) Notice: Subject to any disclaimer, the term of this patent is extended or adjusted under 35 U.S.C. 154(b) by 179 days.

(21) Appl. No.: 13/821,922

(22) PCT Filed: Sep. 2, 2011

(86) PCT No.: PCT/EP2011/065228
§ 371 (c)(1),
(2), (4) Date: May 7, 2013

(87) PCT Pub. No.: WO2012/031991
PCT Pub. Date: Mar. 15, 2012

(65) Prior Publication Data
US 2013/0279429 A1 Oct. 24, 2013

(30) Foreign Application Priority Data
Sep. 9, 2010 (FR) .................................. 10 57170

(51) Int. Cl.
*H04H 20/71* (2008.01)
*H04W 72/04* (2009.01)
*H04H 20/42* (2008.01)
*H04H 20/72* (2008.01)

(52) U.S. Cl.
CPC .............. *H04W 72/04* (2013.01); *H04H 20/42* (2013.01); *H04H 20/72* (2013.01)

(58) Field of Classification Search
CPC .................. H04H 20/00; H04H 20/71
USPC .................................................. 370/315, 329
See application file for complete search history.

(56) References Cited

U.S. PATENT DOCUMENTS

| | | | | |
|---|---|---|---|---|
| 5,867,485 A * | 2/1999 | Chambers et al. | ............ | 370/281 |
| 6,560,213 B1 * | 5/2003 | Izadpanah et al. | ............ | 370/338 |
| 6,836,223 B2 * | 12/2004 | Moore | ............ | 341/15 |
| 7,027,789 B2 * | 4/2006 | Ammar | ............ | 455/232.1 |
| 7,242,707 B1 * | 7/2007 | Miao | ............ | 375/130 |
| 7,251,461 B2 * | 7/2007 | Shoji et al. | ............ | 455/101 |
| 2005/0014464 A1 * | 1/2005 | Larsson | ............ | 455/11.1 |
| 2007/0241978 A1 * | 10/2007 | Cheng | ............ | 343/754 |
| 2008/0192660 A1 * | 8/2008 | Li et al. | ............ | 370/294 |
| 2009/0190638 A1 * | 7/2009 | Meir et al. | ............ | 375/222 |
| 2010/0007561 A1 * | 1/2010 | Bucca et al. | ............ | 343/700 MS |

FOREIGN PATENT DOCUMENTS

WO 97/48191 A1 12/1997
WO 97/48196 A1 12/1997

* cited by examiner

*Primary Examiner* — Noel Beharry
*Assistant Examiner* — Calvin Hsieh
(74) *Attorney, Agent, or Firm* — Baker & Hostetler LLP

(57) ABSTRACT

A very high speed SHF-EHF radio system having a very large capacity of several gigabits comprises at least one ultra-wideband base station and an ultra-wideband and multiuse terminal for very high speed wireless systems providing point-to-multipoint transmission of a plurality of simultaneous waveforms in order to provide a plurality of subscribers or customers of various types with multiple services. The base and the terminal comprise ultra-wideband transmitter/receiver means which are capable of exchanging a plurality of waveforms delivered by multiplexes of various modems. The radio of the base has at least one microwave spectrum generator for the multiplexes optimized for each service and for any type of customer. The transmitter/receiver of the radio of the terminal is suited to operating in the subband of the downlink channel and in at least one of the two-way subbands.

13 Claims, 6 Drawing Sheets

MULTI-WAVEFORM AND WIRELESS VERY HIGH THROUGHPUT RADIO SYSTEM

CROSS-REFERENCE TO RELATED APPLICATIONS

This application is a National Stage of International patent application PCT/EP2011/065228, filed on Sep. 2, 2011, which claims priority to foreign French patent application No. FR 1057170, filed on Sep. 9, 2010, the disclosures of which are incorporated by reference in their entirety.

FIELD OF THE INVENTION

The invention relates notably to a wireless high speed radio, base and terminal system within a point-to-multipoint communication network context, for example wireless multimedia networks of MWS (Multimedia Wireless Systems) type. It relates to multifunction, multi-waveform, ultra-wideband millimeter wave radio systems.

The subject matter of the invention is notably radio systems allowing the setup of access systems and devices allowing feeding of base stations (of mobile radio or WiMAX type), more readily known by the term "backhaul" for very high capacity Internet and multimedia, or else very high speed transmission networks, with multiple uses, both for individuals and for companies.

The radio system or radio set according to the invention can be used, by way of example, in systems allowing the delivery, in a sector of several kilometers, of a very high capacity intended for multiple customers of various types (under the radio coverage), joint and several services such as HDTV, symmetrical and asymmetric Internet.

BACKGROUND

Terminology Used

In the remainder of the description, reference is made to the following terms:
- the MWS (Multimedia Wireless System), which is an access and "backhaul" network over a wide area and delivers a plurality of services such as multimedia and Internet to various types of customers in quantity,
- Ultra-wideband (UWB) relates to ultra-wideband radio communications, typically of 500 MHz,
- the "customer", which may be: a company, an individual, a group of individuals (secondary ADSL sub-distributor) or else mobile radio base stations or else a WiMax or Wifi (hot spot) base station,
- a waveform: type of modulation and of normalized medium access (MAC) mode,
- the data rate, which concerns the instantaneous band which the subscriber or the group of subscribers needs, for example for high definition television (HDTV (individual)) or for the virtual office (company),
- the capacity, which relates to the resource allocation or "provisioning" for a number of customers which will be able to be provided with acceptable quality of service (QoS),
- the network base or head, which broadcasts and collects the information from the customers and connects it to the infrastructure network from the point of presence or PoP, which is generally fed by an optical fiber,
- the terminal that is located with each customer,
- millimeter wave or 'EHF' (Extremely-High Frequency) waves: range of frequencies where there may be sufficient bandwidth for applying the invention,
- integrated circuits or MMIC: Microwave Monolithic Integrated Circuit,
- CSM: component surface mounting,
- the word transceiver is used to denote an integrated transmitter/receiver set,
- the term multimedia covers: voice, sound, images and data, and
- the abbreviations SHF and EHF relate to radio systems with frequency intervals of [3, 30 GHz] for SHF and [30-300 GHz] for EHF.

Provision of all of the services of the NET and of the information and communication technologies (ICT) for all has become a major challenge. One of the responses to requirements would doubtless be optical fibers, but the line costs rapidly become too high as soon as major city centers are left, and moreover the capacity is often superfluous.

Furthermore, for the performance contemplated in a medium-density or scattered habitat, the ADSL (Asymmetric Digital Subscriber Line) communication technique is not entirely suitable because of the lengths of the wires, which limit the instantaneous data rate.

The currently known satellite solutions have the drawback of not being at all able to provide sufficient Internet capacity, and they have a low data rate in the return channel with too high a latency for voice.

Ultra-wideband radio systems, using microwaves in the millimeter wave range, have capacities in the same order as those of optical fibers and are more competitive when there is no fiber development. Microwave solutions are preferable provided that they provide the following: sufficient data rates towards the subscriber (notably for multimedia, voice, images and sound), and local capacity, that is to say a passband in the area compatible with the consumption of all of the customers covered by the area. In one area and with the desired data rates, the capacities ensuing therefrom are several gigabits per second (Gbps). Such streams can be obtained in radio only at very high frequencies; in extremely wide bands which very high frequencies have, the highest usable range is the EHF range, corresponding to wavelengths of several millimeters: today, these bands are the only ones to have a spectrum in the GHz class.

In general, the needs encountered by users are of three types: for individuals, multimedia broadcast and notably HDTV, broadcast of asymmetric internet having VDSL class capacity, what is known as 3-play (or now quadruple play, including the mobile radio service); for companies, the need is more symmetrical internet from 20 to 100 Mbps and finally for the backhaul for the base stations of the mobile radio or the WiMAX stations, the requirements are 70 Mbps in the downlink and 30 Mbps in the uplink.

These services, as far as the signal processing and the medium access (MAC) are concerned, can be obtained effectively by commercial modems chosen for each of the desired services.

The radio systems described in the prior art nevertheless do not allow the transmission, simultaneously, jointly and on demand, of various waveforms, of functions and of performance suited to broadcasting and to the collection of contents and uplink and downlink capacities which are differentiated according to the needs of the various customers and their applications.

The patent application WO97/48196 describes a network which allows a plurality of signals to be communicated between a network head command exchange and several subscriber stations. This patent application does not deal with the problems of very wide bandwidth and of very high symmetrical and asymmetric data rate.

SUMMARY OF THE INVENTION

One of the objects of the invention is notably the simultaneous implementation in a wireless point-to-multipoint network, for example of MWS type, of point-to-multipoint very high speed wideband channels in order to jointly serve, in optimum fashion, multiple customers (individuals, companies, etc.) which are associated with various multimedia services (broadcast or video surveillance, for access and backhaul, data, symmetrical and asymmetric, etc) in a given area, for example of several kilometers. These "standardized" waveforms are, by way of example, from commercial wideband radio modems in bands L, S & C, and the use thereof notably allows benefit to be drawn from all technological changes in the field while reducing costs.

The subject matter of the invention relates to a very high speed SHF-EHF radio system having a very large capacity, in the order of several gigabits and comprising at least one ultra-wideband base station and an ultra-wideband and multiuse terminal for very high speed wireless systems providing point-to-multipoint transmission for a plurality of simultaneous services such as multimedia, very high speed internet access, "backhaul" for the base stations, video surveillance, in order to provide a plurality of subscribers or customers of various types with multiple services, characterized in that:
the base comprises at least one ultra-wideband transmitter associated with an antenna, an ultra-wideband receiver associated with a reception antenna,
the ultra-wideband terminal comprises at least one ultra-wideband transmitter/receiver associated with an antenna,
the base and the terminal exchange a plurality of waveforms delivered by multiplexes of various modems,
the base comprises a radio having at least one microwave spectrum "generator" for the multiplex optimized for each service and for any type of customer, and made up of at least one group of channels or downlink subband suited to broadcasting at least multimedia and to delivering at least asymmetric Internet, and of at least one group of channels or subband for access communications and/or for symmetrical and dynamic communications for backhaul communications and video surveillance,
the transmitter/receiver of the radio of the terminal is suited to operating in the subband of the downlink channel, groups $G_1$ & $G_2$, and in at least one of the two-way subbands, groups $G_3$ and $G_4$,
said system comprises means suited to temporally, spectrally and spatially separating a plurality of groups of multiplexes for multimedia, Internet and video surveillance content, having symmetrical and asymmetric data rates and capacities and diversified for a set of various customers.

According to one implementation variant, the microwave spectrum generator has at least the following elements:
A first-level device for the groups $G_1$ and $G_2$ one-way links which is placed in parallel with a second-level device for the groups $G_3$ and $G_4$ two-way links,
the first-level device for the one-way links is made up of a combiner comprising an output $S_{21}$ connected to the transmitter of the base, and an input $E_{21}$ of the combiner is an output of the modems,
the second-level device for the two-way links is provided by a circulator having an output $S_{22}$ coupled to a combiner having an output $S_{23}$ which goes toward the transmitter of the base and by devices having a function which is the inverse of that of the combiner, or a "splitter", said splitter is connected to the receiver of the base, and the signals from the splitter return to the modems through the circulators.

By way of example, the ultra-wideband radio of the base and the ultra-wideband radio of the terminal are suited to processing at least two intermediate frequency ranges for groups of one-way channels $G_1$ and $G_2$ and groups of two-way channels $G_3$ and $G_4$, each group being allocated to a type of service on a waveform that is optimized for its content and for its function, such as performance, symmetry, quality of service or QoS.

According to one variant embodiment, the radio system is characterized in that:
the transmitter of the base has at least the following elements:
means for connection to the outside for the groups of the first-level and second-level multiplexes ($G_1$, $G_2$) and ($G_3$, $G_4$), respectively,
at the output, a microwave transition towards a sectorial antenna having a high level of lateral decoupling for a desired sector, and an output of a local oscillator bound for the receiver of the base, between these inputs/outputs the transmitter comprises:
the oscillator (OL),
a combiner (307) for groups Gi and an intermediate transposition in order to produce the final multiplex for the groups Gi,
an MMIC frequency converter, called an "up converter" comprising: an OL multiplier, an image rejection and OL rejection mixer, an automatic gain control (AGC), a preamplifier,
an MMIC power amplifier,
the sectorial antenna having a high level of lateral decoupling, suited to providing optimum separation between the uplink and downlink signals,
a combiner suited to splitting the local oscillator frequency toward the receiver and toward the mixer, and
said receiver of the base has at least the following elements:
at the inputs, a power supply, a microwave transition from a sectorial antenna having a high level of lateral decoupling covering a fixed sector, and a local oscillator input coming from the transmitter of the base,
at the output, at least one output socket for the groups Gi of the two-way multiplexes,
between these inputs/outputs, the receiver of the base comprises at least:
an MMIC frequency converter "down converter" comprising a low-noise amplifier, an OL multiplier, an image rejection mixer,
a combiner,
a reception automatic gain control AGC which helps to regulate the total level of the group (Gi) for the return channels of $G_3$ and $G_4$ type,
the sectorial antenna having a high level of lateral decoupling.

An integrated transmitter/receiver of a customer may have:
at the input, a single variable gain directional antenna according to the distance area plus a transposition,
at the intermediate-frequency input/output: a first socket for one of the groups of two-way channels for the return channel and one or two sockets for the outputs of the one-way groups of video or Internet type, a switching signal for the duplex of the TDD modem allocated to the customer, between these inputs/outputs, the transmitter/receiver comprises at least one common local oscillator, a reception channel and a transmission channel that is decoupled at the antenna transition by a millimeter wave circulator, the reception channel comprises:

an MMIC "down converter", which is identical to that of the reception channel of the base, a combiner, a coupler for directing the groups at the output of the "down converter" firstly toward the output circulator as far as the groups $G_3$ and $G_4$ two-way link is concerned and secondly toward a transposition for the output of the groups $G_1$ and $G_2$ one-way links, a combiner suited to separating these last two groups $G_1$ and $G_2$, an image rejection mixer suited to transposing said one-way links, said mixer having an oscillator frequency obtained by dividing the common oscillator (OL) of said transmitter/receiver by two.

The transmission channel comprises:

a power supply control center for control voltages, an MMIC "up converter", which is identical to that of the transmitter of the base, comprising notably the transmission AGC and a preamplifier, an MMIC power amplifier, the output of the power amplifier being switched either onto the line or onto a load.

The system may have at least a pair of transmitters/receivers operating in the EHF frequency ranges, having an operating range or passband of at least 250 MHz and suited to reaching 1 GHz, with a frequency range capable of being regulated beyond the GHz and at least over more than 2 GHz.

The system may have means suited to conveying a plurality of one-way and two-way symmetrical and asymmetric waveforms, these waveforms, each having a plurality of channels, are organized into homogeneous groups of the same services which, by virtue of their adaptive number and their channel width, allow delivery of the necessary capacity to the customers for the varied services thereof in an MWS system.

The system may have a multiplex on at least two levels: multiplex of channels of the same waveform at a first level and, at a second level, groups of different waveforms placed on different intermediate frequencies.

According to one variant embodiment, on the one hand, the base is made up of a synchronized UWB transmitter and receiver, the received (uplink) and transmitted (downlink) spectra of which are decoupled jointly by their sectorial antennas, by the time division of the modems and by their channelization, and on the other hand the customer terminal is integrated for transmission/reception, the decoupling between waveforms being provided by circulators and by the time division jointly.

By way of example, the terminal has an antenna chosen from the following list: a short-range patch antenna or a patch antenna integrated in a long-range lens antenna.

The system may be in contact with classes of high speed and very high speed one-way and two-way commercial modems for TVHD, dynamic symmetrical Internet and video surveillance.

By way of example, the system has multifunctional MMICs (AsGa) mounted using CSM.

By way of example, the modules made up of the base and the terminal are arranged as a relay so as to extend the coverage of the MWS.

BRIEF DESCRIPTION OF THE DRAWINGS

Other features and advantages of the present invention will become more clearly apparent on reading the description given by way of illustration but implying no limitation together with appended figures, in which:

DETAILED DESCRIPTION

Figure 1:
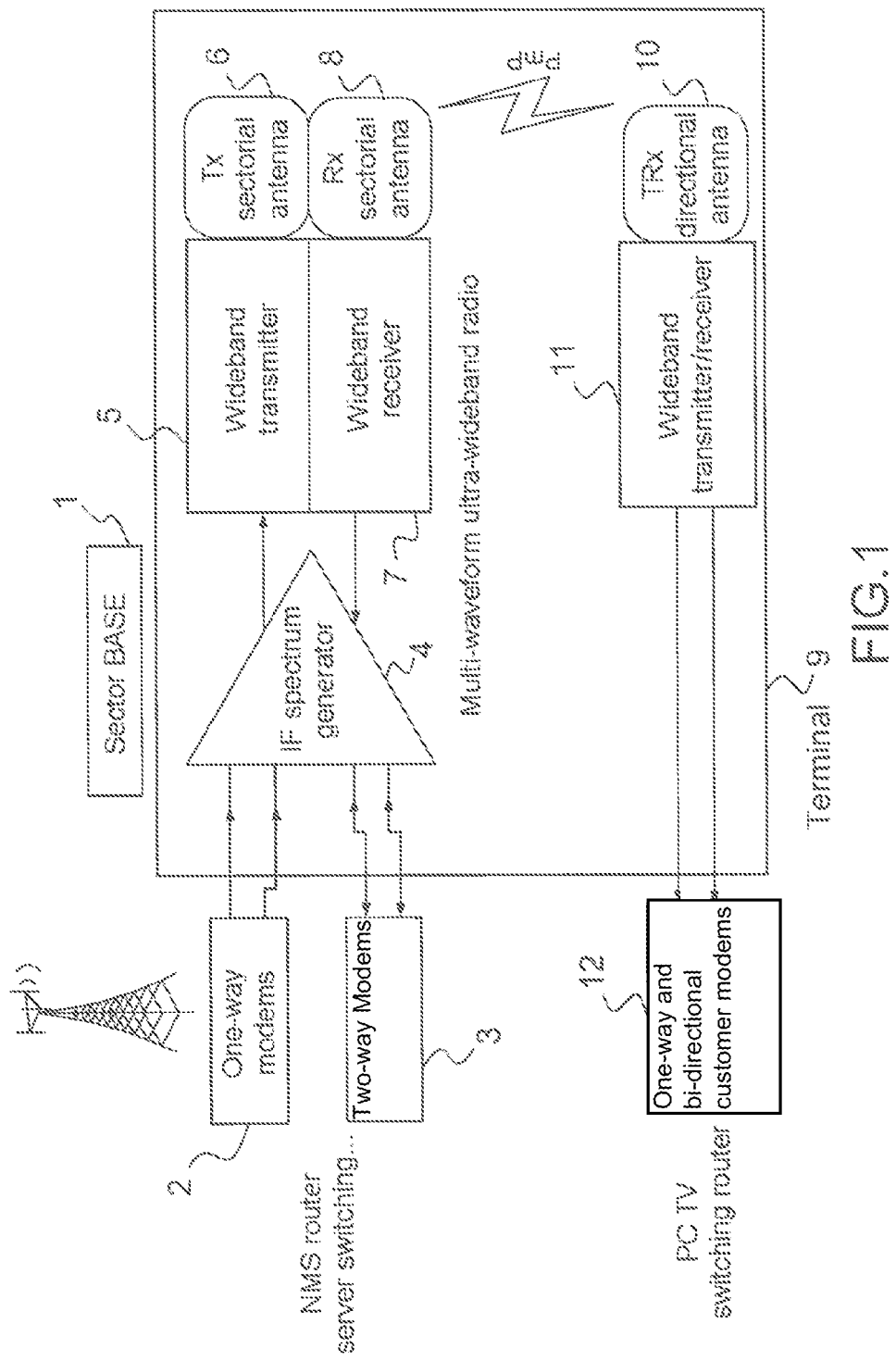
Figure 2A:
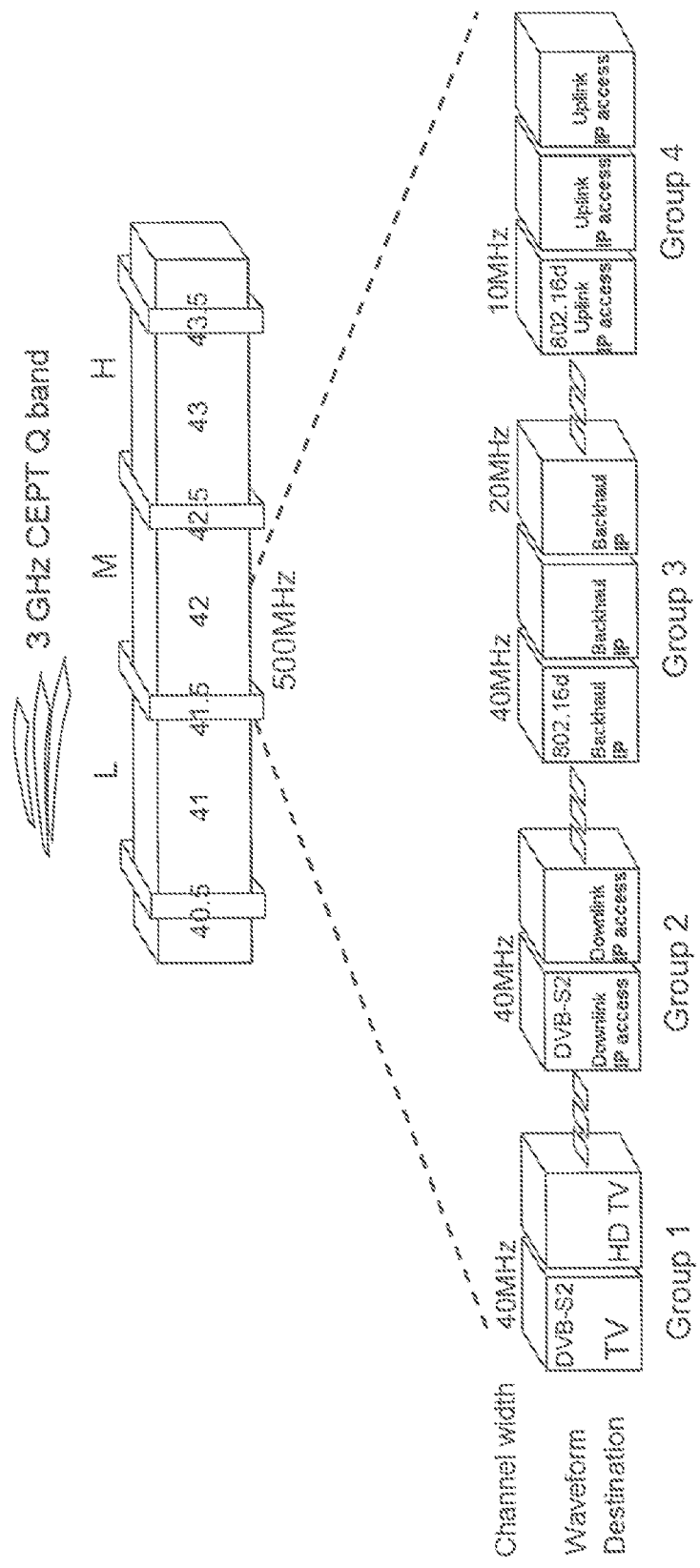
Figure 2B:
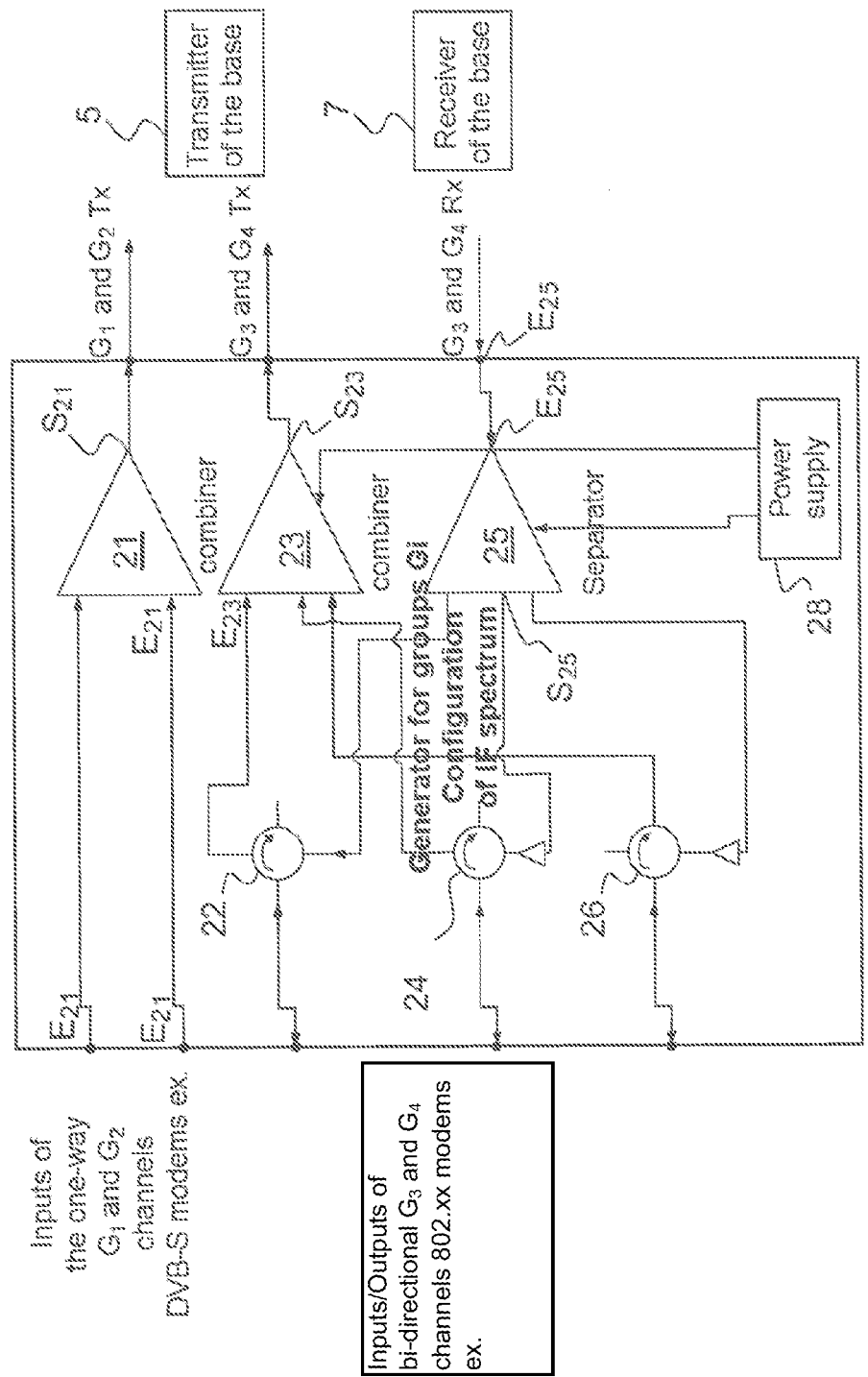
Figure 3:
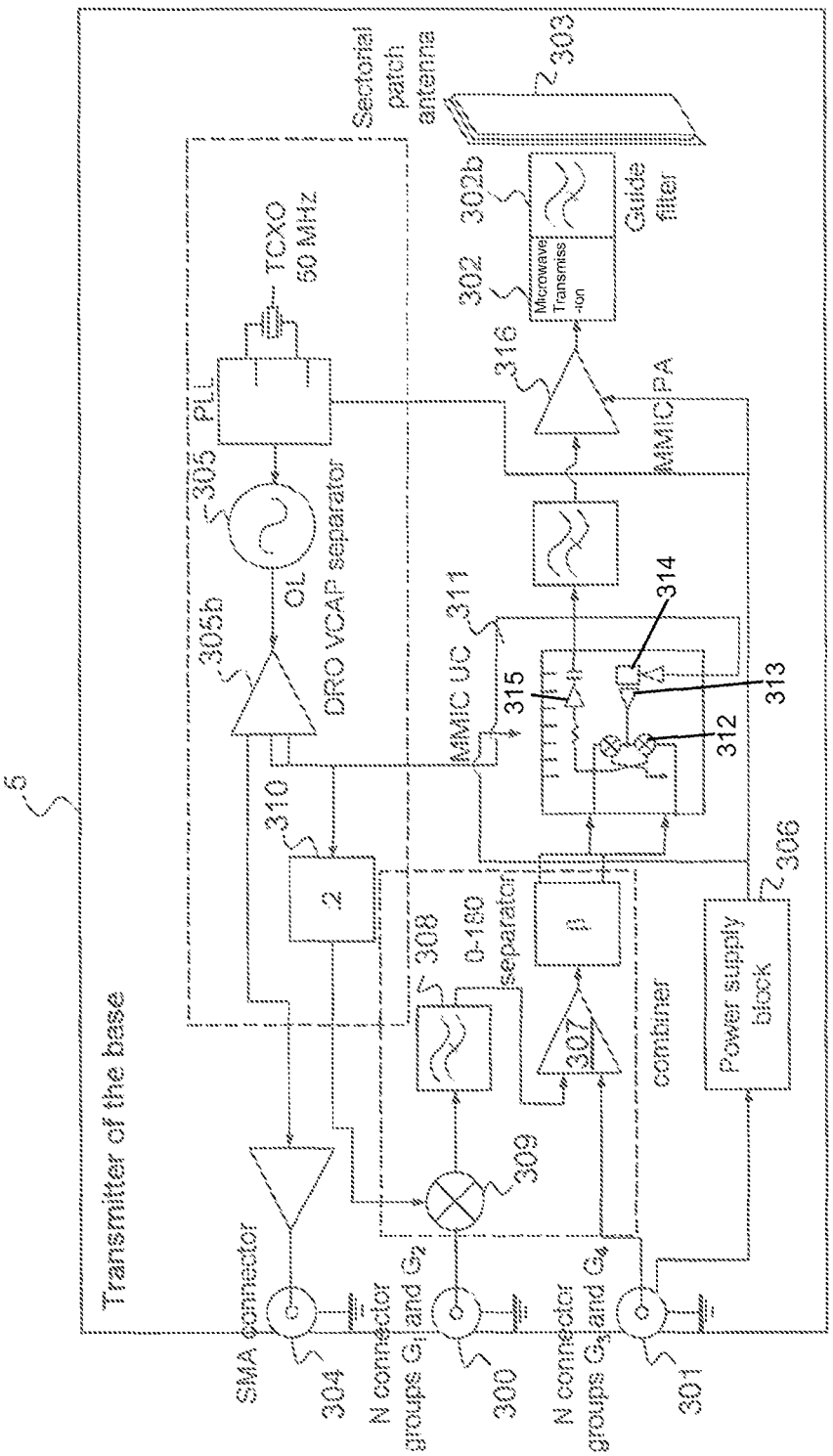
Figure 4:
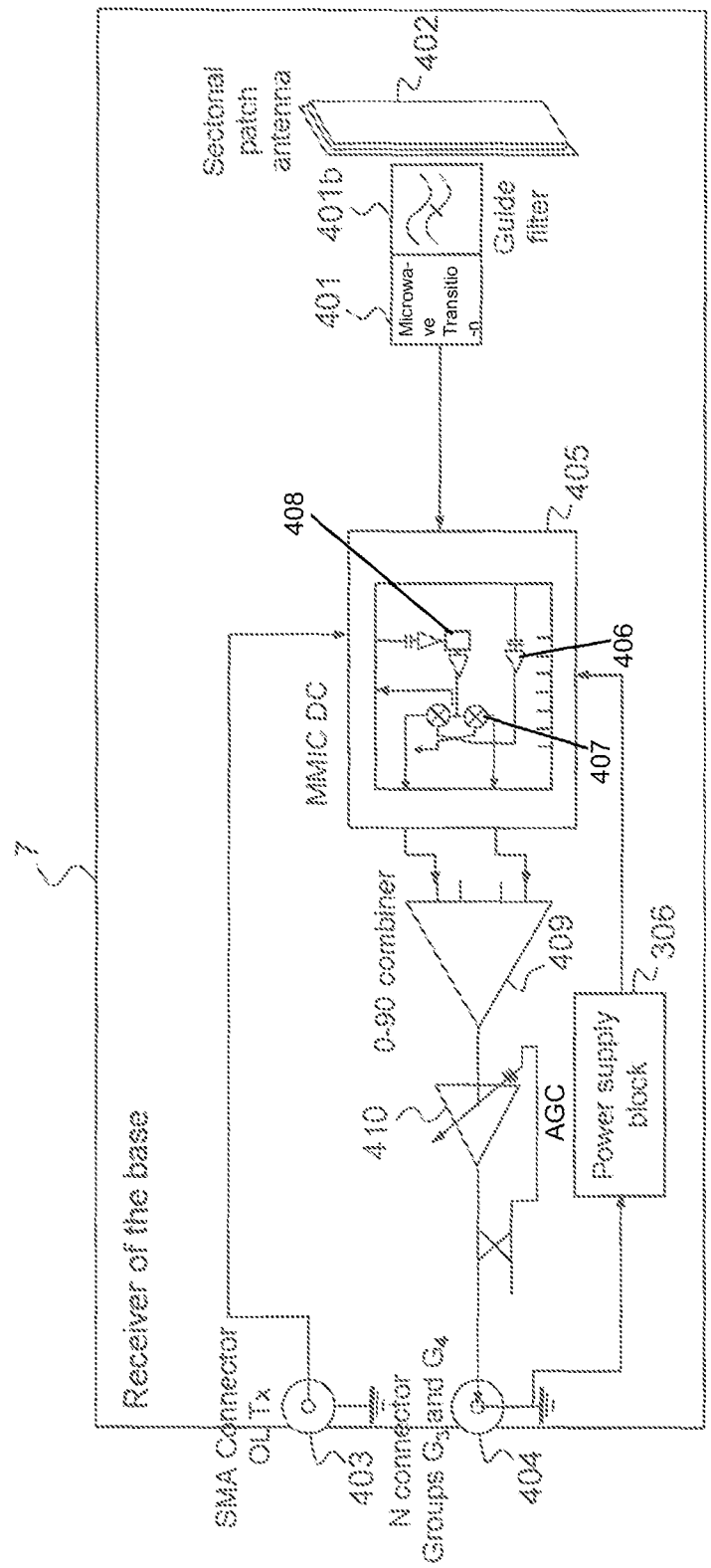
Figure 5:
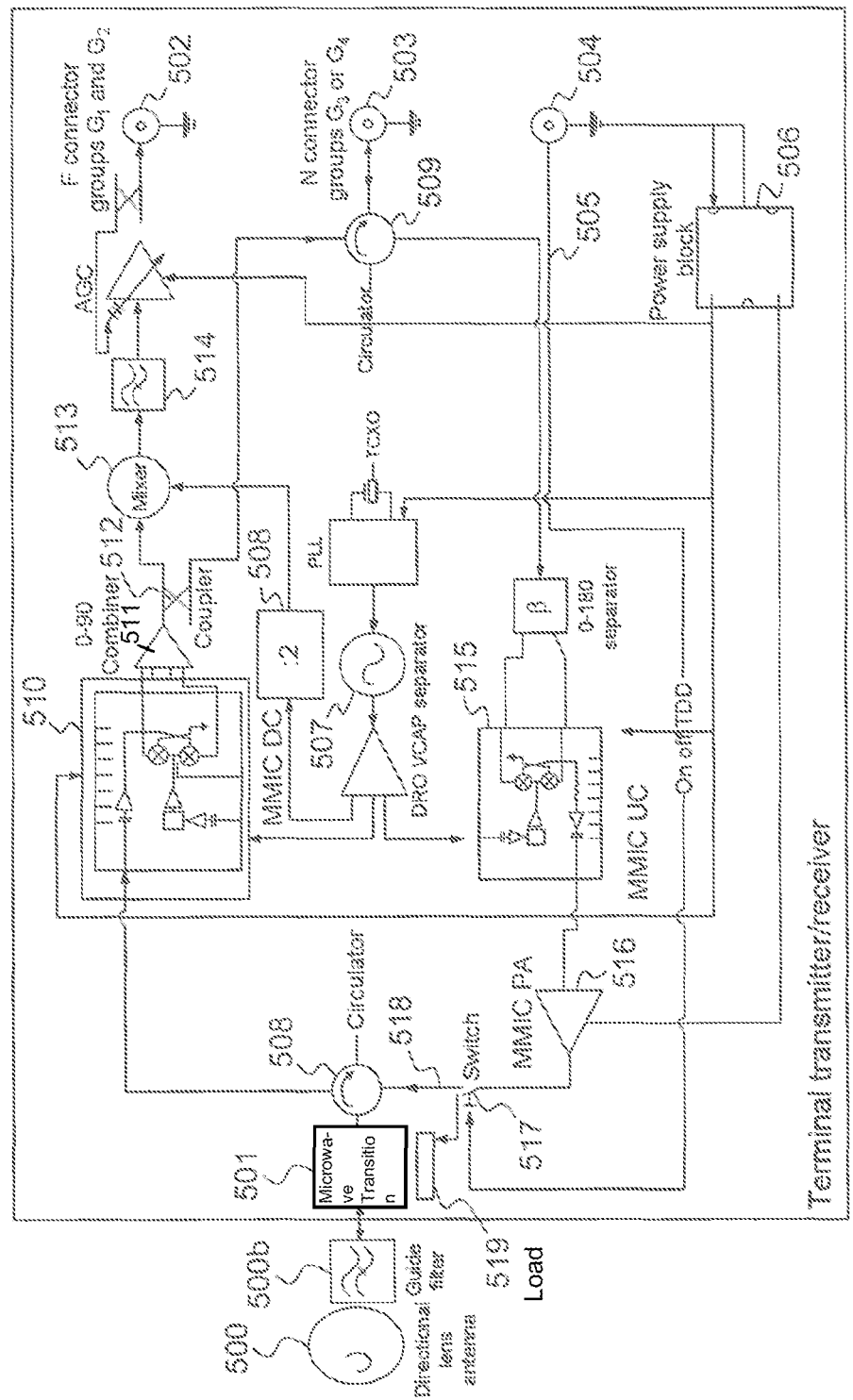

FIG. 1 shows the general outline of the multi-waveform multifunction radio (core of the invention) in an MWS point-to-multipoint system, FIG. 2A shows the principle and composition of the double multiplex radio, the services thereof and the multiplex groups transmitted by the millimeter wave radio, and FIG. 2B gives the implementation diagram for generation of the spectrum processed by the radio at the base of the MWS system, FIG. 3 provides an implementation diagram example for the transmitter of the base according to the description below, FIG. 4 provides a possible implementation diagram for the receiver of the base according to the description below, FIG. 5 provides an implementation diagram example for the transceiver (meaning integrated transmitter/receiver) of the customer according to the description below.

One of the objectives of the multi-waveform ultra-wideband radio according to the invention is notably to optimize the services provided for customers of a very high speed network. The aim of this optimization according to the invention is notably:

to optimize the available passband, in the uplink and downlink directions, to provide the services of a very high speed network with the utmost flexibility and modularity, to optimize transmissions which are subject to severe variations due to rain, particularly at EHF, to optimize each of the services, to optimize the distribution of data rates and capacities to the benefit of the various customers that are being covered.

In summary, the radio set or radio system according to the invention for transmission and reception has at least three modules: one transmitter/receiver pair per sector of the point-to-multipoint base station of the system (for example of MWS type), a terminal for the customers comprising an integrated receiver/transmitter, and a generator or device allowing development of the spectrum transporting the contents and services from the chosen modems for the services and the capacity of the system (for example of MWS type); these elements are detailed in FIGS. 1 to 5.

In order to better illustrate the principle implemented by the invention, the description that follows will be provided for the radio in a network for a very high speed network of MWS type. MWS is defined, according to the CEPT, as an ultra-wideband multiple service (voice, data, image) point-to-multipoint communication network for any type of application, notably access, "backhaul", broadcast, symmetrical and asymmetric communications. The SHF-EHF system notably allows point-to-multipoint transmission for a plurality of simultaneous services such as HDTV multimedia, very high speed internet access, for example 100 Mbps, backhaul for the base stations or "hot spots" (100 Mbps dynamic), video surveillance, simultaneously, in order to provide a plurality of subscribers or customers of various types with multiple services.

The system according to the invention, as described in FIG. 1, is an SHF-EHF radio system having a very high speed, for example 100 Mbps per customer, and a very large capacity in the order of several gigabits. By way of example, the system comprises a radio for an ultra-wideband sector of the base 1 which has a first set of one-way modems 2 and a second set of two-way modems 3. The sets of modems 2, 3 are connected to a microwave spectrum generator for a group of multiplexes for modems that are diversified according to the invention, 4 detailed in FIG. 2B, which is in contact with an ultra-wideband transmitter 5 comprising a sectorial transmission antenna 6 and with an ultra-wideband receiver 7 comprising a sectorial antenna 8. The two sectorial antennas are decoupled to a high level. The radio of the base has at least one microwave spectrum "generator" 4 for the multiplex optimized for each service and for any type of customer. The radio is made up of at least one group of channels or subband: downlink suited to broadcasting at least multimedia and to providing at least asymmetric Internet, and of at least one group of channels or subband for access communications and/or for symmetrical and dynamic communications for the backhaul links.

For this example, reference is made to the ultra-wideband UWB system, which typically involves 500 MHz, 1 GHz for large sectors and 250 MHz for lightweight systems. The radio system operates in millimeter wavebands (such as the bands Ka, Q, W, E . . . ) having very high frequencies in which only the available spectrum can be found.

Associated with the transmitter, the radio of the base has a waveform multiplexer, for example, corresponding to the waveforms suited to the video services that are to be broadcast, (TV, HDTV, VoD etc.), to the internet services that are to be broadcast and collected or to the video surveillance that is to be collected.

Associated with the receiver of the base, a demultiplexer for the waveforms intended for internet services (collection of access and backhaul) returning from the terminals of the customers allows separation of the streams of the waveforms allocated to the customer. These streams may be either downlink broadcast streams or two-way streams for the return channel or symmetrical backhaul streams.

An ultra-wideband and multiuse terminal 9 comprises a reception antenna 10, for example a directional antenna, and an integrated transmitter/receiver set 11 capable of receiving the waveforms transmitted by the radio of the base which are intended for the customer having the terminal and capable of transmitting the return channel for the waveform allocated to this customer.

The integrated transmitter/receiver 11 is in contact with a plurality of one-way and two-way modems 12.

This radio equipment provides the point-to-multipoint transmissions for an arrangement of a plurality of waveforms that are best suited to the functions or services of the customers: suited to the downlink video and internet channels, suited to the symmetrical "backhaul" channels or suited to the asymmetric video return channels. These two pieces of radio equipment (sector of the base and terminal) have the notable features of being ultra-wideband (UWB) and multi-waveform.

The ultra-wideband (UWB) spectrum which conveys the various information between a sector of the base and the customer terminals in this sector is of a width suited to the range allocated to the operator, for example, from 250 MHz to 1 GHz and suited to the required capacity in the sector.

Taking account of the constraints of propagation and of the multiple applications, the waveforms for, notably, the cited types of service will be optimized by different choices. By way of example, for individuals the multimedia broadcast and the internet downlink channel will be optimized using DVB-S2, the most recent standard for transmitting multimedia content by satellite, which has the best physical layer for broadcast on microwave as demonstrated by satellite; for individuals, the return channel has a low capacity compared to the downlink channel, and it therefore appears that the 802.16d waveform is close to optimum; for companies and groups of companies, the 802.11n waveform currently appears to be the best suited (high symmetrical data rate), and it is also very well suited to the "backhaul" for node B (base of the mobile radio). Other waveforms appear such as ECMA386 or those of WiGig. The development of waveform technologies continues and one of the objectives of the radio system according to the invention is to use the best technologies suited to each application (multimedia, internet, etc.), to each function (continuous downlink channel, timeslot or "burst" return channel) and to each configuration (backhaul for radio base station, video surveillance . . . or direct access to homes or companies).

By way of example, the ultra-wideband spectrum is organized as shown in FIG. 2A (for example for a range of 500 MHz). As can be seen in this FIG. 2A, this spectrum is organized by group Gi of services, and the bandwidth of these groups is suited to the needs of the customers in a given sector. These groups of services are made up of multiplexes for channels from, by way of example, commercial modems. The services can be provided by commercial modems, which are therefore multiplexed by groups for the same type of service.

By way of example, FIG. 2A shows four groups of services: video broadcast, internet broadcast, symmetric Ethernet (backhaul), asymmetric Ethernet (access); this example is non-limiting insofar as the set of combinations of one-way or two-way, symmetrical and asymmetric links is large in a very wide spectrum.

Indeed, the commercial modems which can be used for each aforementioned service or service used by a customer can be programmed with channels of 10, 20, 30, 40 or even 50 MHz; the modems may be one-way or two-way, which affords hundreds of possible combinations in a 1 GHz band in accordance with all types of situations situation that can be encountered.

One of the objectives and relevance of the invention is precisely that of providing a radio system which allows implementation of all these possibilities in order to optimize the services covered by the sector. The makeup of the spectrum is configured by the commercial modems that are connected to the radio system. Commercial modems deliver signals over standard frequency ranges notably in bands L, S and C; the most common bands are bands L, ISB: the extended Intermediate Satellite Band (950-2250 MHz) and band C (IMS from 4.9 to 5.8 GHz). The frequencies of the modems constitute the intermediate frequencies of the transmitters and receivers of the base and of the terminals. The spectrum is therefore made up of a plurality of multiplexes for modems thus constituting the groups of services delivered to the customers on various microwave intermediate frequencies.

At the base of the MWS, the makeup of the spectrum is produced by the arrangement of groups of modems corresponding to the desired services. The spectrum comprises from two to several groups of modems: $G_1$ to $G_4$ (FIG. 2A). Each group Gi is a multiplex of modems of identical waveforms and of variable bandwidth (for example from 10 to 50 MHz each), and therefore each group contains an organized set of channels, the total of which corresponds to the capacity required for the service under consideration. These multiplex groups are formed in the base station (per sector) by combining the commercial modems. These groups are therefore coupled to the radio of the base which is going to multiplex them and transpose them and provide the interchange with the terminals according to their demands and their service allocations (SLA: Service Level Agreement).

At the base and by sector, the makeup and operation of the spectrum are effected, by way of example, in the manner described below:

at the transmitter of the base, the spectrum transmitted over the millimeter wave range is produced by combining two methods: combination of the groups of the same range of intermediate frequencies then the transpositions of all the intermediate frequency bands into the millimeter wave transmission band (allocated to the operator), the final multiplex on the millimeter wave band is shown in FIG. 2A.

At the receiver of the base, the spectrum is demultiplexed using the opposite methods to those above: first of all, the transpositions are effected from the millimeter wave band to the intermediate frequency bands of the groups of modems and then the multiplex groups of the same service are separated.

At the terminal, the spectrum is operated in the following manner:

The transmitter/receiver or transceiver in reception mode carries out, in the same manner as the receiver for the base, the transposition from the millimeter wave band to the intermediate frequency bands of the modems allocated to the customer. It should be noted at this stage that the demultiplexing in each intermediate frequency band (or groups) is taken into account by the modem of the customer for which the channel has been programmed during configuration of the network (from the sector of the base). With the exception of a relay terminal, the radio of the terminal therefore has no need of its own demultiplexing apart from the separation of the groups.

The transceiver in transmission mode transmits only one channel, called the "return" channel although it is two-way, corresponding to the modem channel which has been allocated to it by the base. The advantage of configuration of the wideband multiplex by the base is the universal nature that can be accorded to the transceiver, which is therefore able to serve any type of customer (according to the choice of the modem in terms of channel width and access protocol). The base likewise has a universal nature at the radio level by virtue of the simple addition or activation of modems of various types on the basis of growing needs.

In this description, the chosen band is one of the subbands of the Q band [40.5-43.5 GHz] normalized by the CEPT and totally relevant to the MWS, such implementation also being possible in other frequency ranges provided that they have sufficient spectral width. Generally, the millimeter wave ranges are well suited to such implementation.

FIG. 2B describes an example of a spectrum generator 4 for groups Gi in relation to FIG. 2A.

At both the input and output of the radio of the base station, the spectrum is organized as shown in FIG. 2A by configuring this spectrum using intermediate frequencies (FIG. 2B). To this end, the first level of multiplexing is produced for the contents of the same nature on the basis of the commercial modems as shown in this very FIG. 2B: two types of devices or multiplexes placed in parallel are found depending on whether a one-way link (groups $G_1$ and $G_2$) or two-way links (groups $G_3$ and $G_4$) are involved.

A first-level multiplex for the one-way links is produced by a combiner 21, the output $S_{21}$ of which leads to the transmitter 5 of the base. The input $E_{21}$ of a combiner is the output of a commercial modem (of DVB-S type, for example), a second-level multiplex for the two-way links is produced by a circulator 22, the output $S_{22}$ of which leads to a combiner 23 having an output $S_{23}$ which leads to the transmitter 5 of the base, and by devices having an opposite function to that of the combiner, better known by the name "splitters" 25, which are connected to the receiver 7 of the base, with the signal from the "splitter" 25 returning to the modems through the circulators 22 to 26. The inputs/outputs of the commercial modems, for example of Ethernet_802.11n or 802.16d type, are connected to the circulators 22 to 26, which therefore orient the downlink streams to the combiner 23 and take up the uplink streams from the splitter 25.

A common power supply 28 for the various elements making up the generator for the groups of services is provided for the purpose of supplying power to the components and the radios (typically N or SMA sockets).

FIG. 3 shows an example of an ultra-wideband transmitter 5 based on the invention for the base.

The transmitter has the following input/outputs: at the input the sockets or connectors 300 and 301 for the aforementioned groups ($G_1$, $G_2$) and ($G_3$, $G_4$), respectively. At the output a microwave transmission 302 to a sectorial antenna 303 (following passage through a filter 302b) covering the desired sector, and an output 304 of a local oscillator 305 bound for the receiver.

At the control and power supply input/output, there is access to the presence and power supply control 306, the automatic gain control command and the power supply voltage (12-24 or 48 V). The transmitter 5 has a power supply control center for distributing all of the necessary voltages to the power supply contacts of the MMIC.

Between these inputs/outputs, the transmitter comprises:
the very stable, low phase noise band X oscillator (OL) 305, these two conditions being necessary for the performance of the radio, a combiner 307 for groups Gi and an intermediate transposition (denoted CGi) 308 and a mixer 309 so as to implement the final multiplex (for the groups Gi), on the millimeter wave band (reference in FIG. 2A). The intermediate transposition is produced by using the local oscillator frequency divided by 2, (310), and the mixer 309, an MMIC frequency converter, called an "up converter", a system used for transmitting uplinks for the signals (denoted MMIC UC), 311, comprising: an OL multiplier 312, an image rejection and OL rejection mixer 313, an AGC 314 (automatic gain control), a preamplifier 315, an MMIC power amplifier 316 (denoted MMIC PA), typically from 25 to 33 dbm (these values being indicative of an acceptable outcome at several Kms), the sectorial antenna 303 having a high level of lateral decoupling (for example patch column), designed to provide optimum separation between the uplink and downlink signals, a "splitter" 305b allows the local oscillator frequency to be split toward the receiver 7 (FIG. 2B) and toward the mixer 309.

FIG. 4 shows an example of the receiver of the base according to the invention.

The receiver 7 of the base has the following inputs/outputs: as inputs, the power supply 306 (identical to that of the transmitter), a microwave transition 401 (K socket or guide) from a sectorial antenna 402 covering the sector, and a local oscillator input 403 from the transmitter; at the output, the output sockets 404 of the groups Gi for the two-way multiplexes.

Between these inputs/outputs, the receiver 7 comprises:
an MMIC frequency converter called a "down converter" 405 (denoted MMIC DC) comprising a low-noise amplifier 406, an OL multiplier 407, an image rejection mixer 408,
a combiner 409.
A reception AGC 410 which helps to regulate the total level for the group (Gi) of the return channels ($G_3$ & $G_4$ type).
The sectorial antenna 402 having a high level of lateral decoupling, which is identical to the sectorial antenna of the transmitter, for example of patch type, said sectorial antenna being designed to this end.

FIG. 5 shows an example of a transceiver or integrated transmitter/receiver of a customer.

The equipment of any customer has, at the microwave input, a single variable gain directional antenna 500 according to the distance area (patch, lens or reflect array) plus a microwave transition 501, after a filter 500b which is used for its customary functionalities and is known to a person skilled in the art.

At the IF (intermediate frequency based on the frequencies of the modems) input/output: a first socket 503 or connector for one of the groups of two-way channels, notably for the return channel, and one or two sockets 502 for the outputs of the one-way groups (video or internet type), A power supply and TDD signal control connector 504, for the power supply block and for the presence of the power supply, At the control input/output, there is access to a signal 505 for switching the duplex of the TDD modem allocated to the customer, the control voltage of the transmission AGC (integrated in the MMIC UC), the control of presence of the power supply and the power supply voltage (12-24 or 48 V).

Between these inputs/outputs, the transceiver has: a power supply control center 506 for all of the voltages of the MMICs, a common local oscillator (OL) 507 identical to that of the base, a reception channel and a transmission channel, which are decoupled at the antenna transition by a millimeter wave circulator 508. The transmission/reception separation of the two-way channel (groups $G_3$ and $G_4$) is provided by a circulator coupled to the input/output of the modem for this group.

The reception channel comprises (apart from the microwave transition and the circulators which are common to transmission and reception:
the MMIC "down converter" (MMIC DC) 510, which is identical to that of the reception channel of the base, a combiner 511,
a coupler 3 db for directing the groups at the output of the "down converter" firstly toward the output circulator 509 as far as the two-way link is concerned (groups $G_3$ and $G_4$) and secondly toward a transposition for the output 502 of the one-way links (groups $G_1$ & $G_2$), a splitter (optionally at the transceiver) thus allows separation of these latter two groups,
the transpositions of the one-way links is obtained by an image rejection mixer 513, the "oscillator" reference for which is obtained by dividing the common oscillator 507 (OL) of the transceiver by two,
The mixed signals are filtered 514.
The transmission channel comprises (apart from the microwave transition and the circulators which are common to transmission and reception):
the control voltages (power supply presence, transmission AGC, blocking of the transmitter upon reception of the group ($G_3$ or $G_4$),
the MMIC "up converter" (MMIC UC) 515, which is identical to that of the transmitter of the base comprising, notably, the transmission AGC,
the MMIC power amplifier 516 from 25 to 30 dbm (MMIC PA) according to the application (access or backhaul). The output of the power amplifier is switched 517 either onto the line 518 or onto a load 519.

The radio system according to the invention has the following advantages, notably:
the ultra-wideband capability of the invention allows all services to be organized on the MWS (Multiservice Point-to-Multipoint system) for any type of customer according to the demanded capacity;
the services and their capacity can be provided by commercial modems, depending on the needs of the customers of the system according to the invention. Thus, as a result of the allocation of the waveforms to the groups and contents, it is possible to obtain the best performance for each content and each user.
the advantage of configuring the spectrum, according to the invention, on the basis of diversified modems is the modular adaptation, in terms of capacity by service for global demand, to demand by type of service (group) and to the needs of each of the customers. This is done by the simple addition (or start-up) of modems for the desired type of service.
The modularity and the ultra-wideband of the MWS, having a radio system such as that described in the invention, a scalable system, growing with demand, both in terms of capacity and in terms of the type of service and also coverage;
the ultra-wideband allows a capacity of several gigabits, corresponding to the current and future needs of MWS systems for a large number of deployments; urban, suburban, residential or commuter areas. Rural areas (groups of villages);
the integration of a plurality of services in the same equipment has the appearance of a single multifunctional network to the subscriber and to the operator;
the compact and modular design of the radio or radio system according to the invention allows it to be used for relays for extending the network. The same modules for the relays and the terminals provide economical relaying;
simple and compact integration of the terminal of the subscriber thus allows a wide broadcast, easy installation and a reduced price;
optimization of the associated radio, according to the invention, to the various modems allows the best spectral efficiency;
the ultra-wideband and the bands of the EHF, which are associated with efficient modems, and the qualities of the radio (sensitivity, linearity, low phase noise) allow lower radiation power, as compared with any other terrestrial radio system, such as terrestrial television, WiFi or mobile radio (GSM), and therefore results in a very ecological system, the innocuous nature of which is guaranteed because of the very weak field in proximity to the radio (measurements taken by Bureau Veritas have proved fields of <0.1 V/m).

The invention claimed is:
1. A very high speed Super High Frequency-Extremely High Frequency (SHF-EHF) radio system having a very large capacity of an order of Gigabits per second, and comprising at least one ultra-wideband base station and an ultra-wideband and multiuse terminal for very high speed wireless systems, with a data rate of hundreds of Megabits per second, providing point-to-multipoint transmission for a plurality of simultaneous services including multimedia, very high speed internet access, backhaul for base stations, video surveillance, in order to provide a plurality of subscribers or customers of various types with multiple services, comprising:

the base station having at least one ultra-wideband transmitter associated with an antenna, an ultra-wideband receiver associated with a reception antenna, the ultra-wideband terminal having at least one ultra-wideband transmitter/receiver associated with an antenna, wherein the base station and the terminal exchange a plurality of waveforms delivered by multiplexing of a plurality of modems, the base station having a radio having at least one microwave spectrum generator for an adaptive wideband channel microwave multiplex optimized for each service and for a plurality of types of customers, and made up of at least one group of channels or downlink subband suited to broadcasting multimedia and to delivering an asymmetric throughput Internet having different upload and download throughputs, and of at least one group of channels or subband for access communications and/or for symmetrical and dynamic communications for backhaul communications and video surveillance, wherein the transmitter/receiver of a radio of the terminal is suited to operate in the downlink subband for groups G1 and G2, and in at least a bidirectional subband for groups G3 and G4, where G1 refers to a first group of service, G2 refers to a second group of service, G3 refers to a third group of service, and G4 refers to a fourth group of service, each said group G1-G4 having a respective bandwidth based upon needs of customers in a given sector, said system being based on a microwave architecture comprising multiplexers and demultiplexers configured to temporally, spectrally, and spatially separate a plurality of groups for multimedia, Internet and video surveillance content, having symmetrical and dynamic, asymmetric data rates and capacities and diversified for a set of various customers in a time division duplex (TDD) mode, wherein the microwave spectrum generator is suited to produce a microwave multiplex of 1 GHz width for contiguous two-way channels allowing dynamic uplink and downlink communications and asymmetric downlink channels, all of these channels operating simultaneously, and has at least the following elements:

a first-level device for the groups G1 and G2 one-way links which is placed in parallel with a second-level device for the groups G3 and G4 two-way links, the first-level device for the one-way links is made up of a combiner comprising an output connected to the transmitter of the base station, and an input of the combiner is an output of the various modems, the second-level device for the two-way links is provided by a circulator having an output coupled to a combiner having an output which goes toward the transmitter of the base station and by devices having a function which is the inverse of that of the combiner, or a splitter, said splitter is connected to the receiver of the base station, and the signals from the splitter return to the modems through circulators.

2. The radio system as claimed in claim 1, wherein the ultra-wideband radio of the base station and the ultra-wideband radio of the terminal are suited to process at least two intermediate frequency ranges for groups of one-way channels G1 and G2 and groups of two-way channels G3 and G4, producing a 1 GHz channel band multiplex, the channel bandwidth of which varies from 10 to 50 MHz and the number of contiguous channels in which varies from 10 to 40, each group being allocated to a type of service on a waveform that is optimized for its content and for its function, including performance, dynamic symmetry, or quality of service (QoS).

3. The radio system as claimed in claim 1, wherein the multiplexes for groups G1 to G3 are produced using microwaves in bands L, S and C, the transmitter of the base station has at least the following elements:

a plurality of connectors to the outside and for the groups of the first-level and second-level multiplexing for groups (G1, G2) and (G3, G4) respectively, at an output, a microwave transition towards a sectorial antenna for a desired sector, and an output of a local oscillator bound for the receiver of the base station, between inputs/outputs the transmitter comprises:

the oscillator (OL), a combiner for groups for a service offered on the channels and an intermediate transposition and in order to produce a final multiplex for the groups Gi, a Microwave Monolithic Integrated Circuit (MMIC) frequency converter, called an up converter, comprising: an OL multiplier, an image rejection and OL rejection mixer, an automatic gain control (AGC), a preamplifier, an MMIC power amplifier, the sectorial antenna having a level of lateral decoupling, suited to providing optimum separation between uplink and downlink signals, a combiner suited to splitting the local oscillator frequency toward the receiver and toward a mixer, and said receiver of the base station has at least the following elements:

at inputs, a power supply, a microwave transition from a sectorial antenna having a level of lateral decoupling covering a fixed sector, and a local oscillator input coming from the transmitter of the base station, at an output, at least one output socket for the groups Gi of the two-way multiplexes, between these inputs/outputs, the receiver of the base station comprises at least:

an MMIC frequency converter down converter comprising a low-noise amplifier, an OL multiplier, an image rejection mixer, a combiner, a reception automatic gain control AGC which helps to regulate the total level of the group for return channels, the sectorial antenna having a level of lateral decoupling.

4. The radio system as claimed in claim 1, wherein an integrated transmitter/receiver of a terminal has:

at an input, a single variable gain directional antenna designed according to a coverage area plus a transition, at an intermediate-frequency input/output: a first socket for one of the groups of two-way channels for a return channel and one or two sockets for the outputs of the one-way groups of video or Internet type, a switching signal for the duplex of a Time Division Duplex (TDD) modem allocated to the customer, between these inputs/outputs, the transmitter/receiver comprises at least one common local oscillator, a reception channel and a transmission channel, the reception channel and the transmission channel being decoupled at the antenna transition by a millimeter wave circulator, and the reception channel comprises:

a Microwave Monolithic Integrated Circuit (MMIC) down converter, which is identical to that of a reception channel of the base station, a combiner, a coupler for directing the groups at the output of the down converter firstly toward an output circulator as far as the groups G3 and G4 two-way link is concerned and secondly toward a transposition for the output of the groups G1 and G2 one-way links, a combiner suited to separating these last two groups G1 and G2, an image rejection mixer suited to transpose said one-way links, said mixer having a frequency obtained by dividing the common oscillator (OL) of said transmitter/receiver by two;

and the transmission channel comprises:

control voltages, an MMIC up converter, which is identical to that of the transmitter of the base station, comprising a transmission AGC and a preamplifier, an MMIC power amplifier, the output of the power amplifier being switched either onto a line or onto a load.

5. The radio system as claimed in claim 1, further comprising:

at least a pair of transmitters/receivers operating in the EHF frequency ranges, having an operating range or passband of at least 250 MHz and being able to reach 1 GHz, with a frequency range being regulated beyond the GHz and at least over more than 2 GHz.

6. The radio system as claimed in claim 1, further comprising a set of modems for conveying a plurality of two-way symmetrical and asymmetric waveforms, the symmetrical and asymmetrical waveforms, each having a plurality of channels, are organized into homogeneous groups of the same services which, by virtue of their adaptive number and their channel width, allow delivery of the necessary capacity to the customers for the varied services thereof in a Multimedia Wireless System (MWS), the symmetrical waveforms having substantially same download and upload throughputs and the asymmetrical waveforms have different download and upload throughputs.

7. The radio system as claimed in claim 1, further comprising a multiplex on at least two levels: multiplex of channels of a same waveform at a first level and, at a second level, groups of different waveforms placed on different intermediate frequencies.

8. The radio system as claimed in claim 1, wherein: the base station is made up of a synchronized UWB transmitter and receiver, the received (uplink) and transmitted (downlink) spectra of which are decoupled jointly by respective sectorial antennas, by a time division of the plurality of modems and by respective channelization, and a customer terminal is integrated for transmission/reception, with decoupling between waveforms being provided by circulators and jointly by a time division.

9. The radio system as claimed in claim 1, wherein the terminal has a patch antenna.

10. The radio system as claimed in claim 1, being in contact with classes of one-way and two-way business modems for TVHD, dynamic symmetrical Internet and video surveillance.

11. The radio system as claimed in claim 2, further comprising:

multifunctional MMICs (Microwave Monolithic Integrated Circuit) (GaAs) (Gallium arsenide mounted using Component Surface Mounting (CSM).

12. The radio system as claimed in claim 1, wherein modules in the base station and the terminal are arranged as a relay to extend the coverage of an MWS (Multimedia Wireless System).

13. The radio system as claimed in claim 1, being in contact with classes of one-way and two-way business modems for TVHD, dynamic symmetrical Internet and video surveillance.

* * * * *